(12) United States Patent
Morris et al.

(10) Patent No.: US 11,905,188 B2
(45) Date of Patent: Feb. 20, 2024

(54) ARTICLE AND METHOD FOR MAKING SAME

(71) Applicant: SAINT-GOBAIN PERFORMANCE PLASTICS CORPORATION

(72) Inventors: Timothy J. Morris, Bridgeton, NJ (US); Donald G. Curran, Swarthmore, PA (US); David R. St. Germain, Garden Grove, CA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 159 days.

(21) Appl. No.: 17/350,173

(22) Filed: Jun. 17, 2021

(65) Prior Publication Data

US 2021/0309541 A1    Oct. 7, 2021

Related U.S. Application Data

(63) Continuation of application No. 15/418,482, filed on Jan. 27, 2017, now abandoned.

(60) Provisional application No. 62/288,050, filed on Jan. 28, 2016.

(51) Int. Cl.
| | |
|---|---|
| *C02F 1/32* | (2023.01) |
| *C08J 5/00* | (2006.01) |
| *B29C 48/00* | (2019.01) |
| *B29C 48/10* | (2019.01) |
| *B29C 69/00* | (2006.01) |
| *B29C 71/02* | (2006.01) |
| *B29C 71/04* | (2006.01) |
| *B29C 35/08* | (2006.01) |
| *B29C 48/37* | (2019.01) |
| *B29C 48/09* | (2019.01) |
| *B29C 48/36* | (2019.01) |
| *B29K 27/12* | (2006.01) |
| *B29L 23/00* | (2006.01) |

(52) U.S. Cl.
CPC ............ *C02F 1/325* (2013.01); *B29C 48/022* (2019.02); *B29C 48/10* (2019.02); *B29C 69/001* (2013.01); *B29C 71/02* (2013.01); *B29C 71/04* (2013.01); *C08J 5/00* (2013.01); *B29C 48/09* (2019.02); *B29C 48/362* (2019.02); *B29C 48/37* (2019.02); *B29C 2035/085* (2013.01); *B29C 2035/0827* (2013.01); *B29C 2035/0877* (2013.01); *B29K 2027/12* (2013.01); *B29K 2995/0018* (2013.01); *B29L 2023/005* (2013.01); *C02F 2303/04* (2013.01); *C08J 2327/18* (2013.01); *C08J 2329/10* (2013.01)

(58) Field of Classification Search
CPC .......... C02F 1/325; C08J 5/00; C08J 2327/18; C08J 2329/10; B29C 47/0004; B29C 47/0026; B29C 69/001; B29C 711/02; B29C 71/04; B29C 48/022; B29C 48/10; B29C 71/02; B29C 2035/085; B29K 2027/12
USPC ................................. 526/206, 247; 528/488
See application file for complete search history.

(56) References Cited

U.S. PATENT DOCUMENTS

| | | | |
|---|---|---|---|
| 4,859,836 A * | 8/1989 | Lunk ....................... | C08L 27/12 219/505 |
| 5,317,061 A | 5/1994 | Chu et al. | |
| 5,500,257 A * | 3/1996 | Krause ................ | B29C 48/0016 427/322 |
| 5,760,151 A | 6/1998 | Aten et al. | |
| 5,789,047 A | 8/1998 | Sasaki et al. | |
| 8,004,661 B2 | 8/2011 | Luscher | |
| 2003/0040702 A1 | 2/2003 | Wang | |
| 2003/0071225 A1 | 4/2003 | Boehme | |
| 2005/0148800 A1 | 7/2005 | Hwang et al. | |
| 2006/0041091 A1* | 2/2006 | Chang ................... | C08F 214/18 528/488 |
| 2006/0186573 A1 | 8/2006 | Ellis | |
| 2010/0240791 A1 | 9/2010 | Sugiyama et al. | |
| 2010/0310805 A1 | 12/2010 | Ou et al. | |
| 2011/0309032 A1 | 12/2011 | Makl | |
| 2011/0312084 A1 | 12/2011 | Delprat et al. | |
| 2012/0011874 A1 | 1/2012 | Conradt et al. | |
| 2012/0292661 A1 | 11/2012 | Sugiyama et al. | |
| 2013/0078142 A1 | 3/2013 | Gordon | |
| 2013/0078702 A1 | 3/2013 | Dhanasekharan | |

(Continued)

FOREIGN PATENT DOCUMENTS

| | | |
|---|---|---|
| WO | 9748421 A2 | 12/1997 |
| WO | 9805595 A1 | 2/1998 |
| WO | 2012109249 A2 | 8/2012 |

(Continued)

OTHER PUBLICATIONS

International Search Report for PCT/US17/015466 dated May 12, 2017, 1 pg.

(Continued)

*Primary Examiner* — Bijan Ahvazi
(74) *Attorney, Agent, or Firm* — Abel Schillinger, LLP; Chi Suk Kim

(57) ABSTRACT

An article includes a layer including a melt processable fluoropolymer, wherein the fluoropolymer includes a copolymer of a tetrafluoroethylene and a perfluoroether, wherein the article has an ultraviolet transmittance of at least about 50% at a thickness of about 0.040 inches to about 0.062 inches when exposed to ultraviolet radiation of about 200 nm to about 280 nm. Further provided is a method of making the article and an apparatus for purifying water including an article, such as a flexible tube.

18 Claims, No Drawings

(56) References Cited

U.S. PATENT DOCUMENTS

2015/0191561 A1    7/2015   Kitagawa et al.
2017/0217793 A1    8/2017   Morris et al.

FOREIGN PATENT DOCUMENTS

| WO | WO-2014086694 A1 | * | 6/2014 | ............ B29C 71/02 |
| --- | --- | --- | --- | --- |
| WO | 2015031446 A1 | | 3/2015 | |
| WO | 2015031492 A1 | | 3/2015 | |
| WO | 2017132587 A1 | | 8/2017 | |

OTHER PUBLICATIONS

Supplementary European Search Report for EP 17 74 5027 dated Jul. 23, 2019, 10 pp.
"Teflon PFA 350 Molding and Extrusion Resin, Product Information, 2015 TheChemours Company FC, LLC Teflon and any associated logos are trademarks or copyrights of The Chemours Company FC, LLC, Chemours and the Chemours logo are trademarks of The Chemours Company (Year: 2015)".

* cited by examiner

ARTICLE AND METHOD FOR MAKING SAME

CROSS-REFERENCE TO RELATED APPLICATION(S)

This application is a continuation of and claims priority to U.S. patent application Ser. No. 15/418,482, entitled "ARTICLE AND METHOD FOR MAKING SAME," by Timothy J. MORRIS et al., filed Jan. 27, 2017, which claims priority under 35 U.S.C. § 119(e) to U.S. Patent Application No. 62/288,050, entitled "FLEXIBLE TUBE AND METHODS FOR MAKING SAME," by Timothy J. MORRIS et al., filed Jan. 28, 2016, both applications of which are assigned to the current assignee hereof and incorporated herein by reference in their entireties.

FIELD OF THE DISCLOSURE

This application in general, relates to an article and method for making same, and in particular, relates to a flexible tube for fluid conduits.

BACKGROUND

Hoses and tubing are used in a variety of industries including water treatment, food processing, chemical industries, pharmaceutical industries, and fuel industries. In such industries, fluid conduits that have a low surface energy inner surface are used because they are easy to clean and resistant to contaminants. In particular, such industries are turning to low surface energy polymers such as fluoropolymers. However, such fluoropolymers are expensive and often have undesirable properties for certain applications.

In particular, industry uses such fluoropolymers for fluid conduits for water treatment. However, many fluoropolymers do not have the ultraviolet transmittance properties desired to treat and purify water at desirable ultraviolet wavelengths. Further, many fluoropolymers also are inflexible, making the material undesirable for applications that require stress, such as bend radius, pressures, and the like.

As such, an improved flexible tube would be desirable.

SUMMARY

In an embodiment, an article includes a layer including a melt processable fluoropolymer, wherein the fluoropolymer includes a copolymer of a tetrafluoroethylene and a perfluoroether, wherein the article has an ultraviolet transmittance of at least about 50% when measured at a thickness of about 0.040 inches to about 0.062 inches when exposed to ultraviolet radiation of about 200 nm to about 280 nm.

In another embodiment, a method of making an article includes providing a layer including a melt processable fluoropolymer, wherein the fluoropolymer includes a copolymer of a tetrafluoroethylene and a perfluoroether, wherein the article has an ultraviolet transmittance of at least about 50% when measured at a thickness of about 0.040 inches to about 0.062 inches when exposed to ultraviolet radiation of about 200 nm to about 280 nm.

In yet another embodiment, an apparatus for purifying water includes a source of ultraviolet radiation; and a flexible tube, the flexible tube including a layer including a melt processable fluoropolymer, wherein the fluoropolymer includes a copolymer of a tetrafluoroethylene and a perfluoroether, wherein the flexible tube has an ultraviolet transmittance of at least about 50% when measured at a thickness of about 0.040 inches to about 0.062 inches when exposed to ultraviolet radiation of about 200 nm to about 280 nm.

DESCRIPTION OF THE PREFERRED EMBODIMENT(S)

The following description in combination with the FIGURES is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having" or any other variation thereof, are open-ended terms and should be interpreted to mean "including, but not limited to . . . ". These terms encompass the more restrictive terms "consisting essentially of" and "consisting of". In an embodiment, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts. Unless indicated otherwise, all measurements are at about 23° C.+/−5° C. per ASTM, unless indicated otherwise.

In a particular embodiment, an article is provided. The article includes a layer including a fluoropolymer. In an embodiment, the article is a flexible tube. Advantageously, the article has desirable properties for applications such as water treatment via ultraviolet radiation. A method of making the article is further provided. An apparatus for purifying water with the flexible tube is also provided.

The fluoropolymer of the layer of the article typically is a melt processable fluoropolymer. "Melt processable fluoropolymer" as used herein refers to a fluoropolymer that can melt and flow to extrude in any reasonable form such as films, tubes, fibers, molded articles, or sheets. For instance, the melt processable fluoropolymer is a flexible material. For instance, the melt processable fluoropolymer has a flexural modulus of at least about 400 MPa, such as about 400 MPa to about 1000 MP, such as about 500 MPa to about 800 MPa, such as about 500 MPa to about 650 MPa. In an embodiment, the melt processable fluoropolymer has a tensile yield of about 0.5% to about 15%, such as about 1% to about 15%, such as about 1% to about 10%. In a particular embodiment, the melt processable fluoropolymer has a desirable hardness. For instance, the shore hardness of the fluoropolymer of the layer is a shore D of less than about such as less than about 80, or even less than about 70. In an embodiment, the shore D hardness of the fluoropolymer layer is about 50 to about 60. It will be appreciated that the flexural modulus, tensile yield, and shore D hardness of the fluoropolymer layer can be within a range between any of the minimum and maximum values noted above.

Any reasonable melt processable fluoropolymer is envisioned. An exemplary melt processable fluoropolymer for the article may be formed of a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. An exemplary melt processable fluoropolymer includes a copolymer of tetrafluoroethylene and a perfluoroether. In an embodiment, the perfluoroether may be a perfluoroalkyl vinyl ether (PAVE). Any alkyl group is envisioned for the perfluoroalkyl vinyl ether. In a particular embodiment, the perfluoroalkyl vinyl ether is a perfluoromethyl vinyl ether, a perfluoroethyl vinyl ether, a perfluoropropyl vinyl ether, a blend, or combination thereof. In an exemplary embodiment, the melt processable fluoropolymer is a copolymer of a tetrafluoroethylene and a perfluoropropyl vinyl ether, a copolymer of a tetrafluoroethylene and a perfluoromethyl vinyl ether, a copolymer of a tetrafluoroethylene and a perfluoroethyl vinyl ether, a blend, or any combination thereof. In a particular embodiment, the copolymer of tetrafluoroethylene and perfluoroether includes an advantageous weight percent ratio of about 2% to about 12%, such as about 3% to about 10%, or about 4% to about 8%. It will be appreciated that the molar concentration ratio can be within a range between any of the minimum and maximum values noted above. In an embodiment, the melt processable fluoropolymer is substantially free of hexafluoropropylene. "Substantially free" as used herein refers to less than about 1.0% by weight, or even less than about 0.1% by weight of the total weight of the fluoropolymer.

In a further embodiment, the layer may include any additive envisioned. The additive may include, for example, a co-agent, an antioxidant, a filler, an ultraviolet (UV) agent, a dye, a pigment, an anti-aging agent, a plasticizer, the like, or combination thereof. In an embodiment, the use of a co-agent may provide desirable properties such as decreased permeation of small molecules and improved elastic recovery of the layer compared to a layer that does not include a co-agent. Any co-agent is envisioned such as, for example, bis-phenol AF, triaryl isocyanurate (TAIL), Triaryl cyanurate (TAC), an organic peroxide, or combination thereof. Alternatively, the layer may be substantially free of a co-agent, an antioxidant, a filler, an ultraviolet (UV) agent, a dye, a pigment, an anti-aging agent, a plasticizer, or a combination thereof. "Substantially free" as used herein refers to less than about 1.0% by weight, or even less than about 0.1% by weight of the total weight of the fluoropolymer.

In an embodiment, the article may further include an additional polymer that does not adversely affect the ultraviolet transmission properties of the fluoropolymer. In an embodiment, the additional polymer has an ultraviolet transmittance of at least about 50%, such as at least about 60%, or even greater than about 65% at a wavelength of 200 nm to about 280 nm when measured at a thickness as described. For instance, the additional polymer may be polyvinyl chloride (PVC), polyethylene terephthalate (PET), polypropylene (PP), polyethylene (PE), polycarbonate (PC), polymethyl methacrylate (PMMA), acrylic, cyclic olefin copolymer (COC), a blend, or combination thereof. In a particular embodiment, the layer includes at least 70% by weight of the fluoropolymer. For example, the layer may include at least 85% by weight fluoropolymer, such as at least 90% by weight, at least 95% by weight, or even 100% by weight of the fluoropolymer. In an example, the layer may consist essentially of the fluoropolymer. As used herein, the phrase "consists essentially of" used in connection with the fluoropolymer of the layer of the article precludes the presence of non-fluorinated polymers that affect the basic and novel characteristics of the fluoropolymer, although, commonly used processing agents and additives such as an antioxidant, a fillers, a UV agent, a dye, a pigment, an anti-aging agent, and any combination thereof may be used in the fluoropolymer. In a more particular embodiment, the fluoropolymer consists essentially of the copolymer of the tetrafluoroethylene and the perfluoroether, such as the perfluoroalkyl vinyl ether. In an example, the layer may consist of the fluoropolymer. As used herein, the phrase "consists of" used in connection with the fluoropolymer of the layer precludes the presence of any other components within the layer. In a more particular embodiment, the fluoropolymer consists of the copolymer of the tetrafluoroethylene and the perfluoroether, such as the perfluoroalkyl vinyl ether.

The article may have an advantageous ultraviolet transmittance. For instance, the article has an ultraviolet transmittance of at least about 50% when measured at a thickness of the article of about 0.040 inches to about 0.062 inches when exposed to ultraviolet radiation of about 200 nanometers (nm) to about 280 nm. "Thickness" as used herein refers to the wall thickness of the fluoropolymer layer. In an embodiment, the thickness of the fluoropolymer layer may be between about 0.0005 inches and about 0.125 inches. In an embodiment, the article has an ultraviolet transmittance of at least about 60%, or at least about 65%, when measured at a thickness of about 0.040 inches to about 0.062 inches when exposed to ultraviolet radiation of about 200 nm to about 280 nm. In an embodiment, any thickness of the article is envisioned, with the proviso that the ultraviolet transmittance is at least about 50% when exposed to ultraviolet radiation of about 200 nm to about 280 nm. It will be appreciated that the thickness of the fluoropolymer layer can be within a range between any of the minimum and maximum values noted above. In an embodiment, the article consists essentially of the fluoropolymer layer as described. In a more particular embodiment, the article consists of the fluoropolymer layer as described.

Although described as one layer, in an alternative embodiment any number of layers is envisioned. For instance, the article includes at least two layers, or even a greater number of layers. The number of layers is dependent upon the final properties desired for the article. In an embodiment, the article may further include other layers. Other layers include, for example, a polymeric layer, a reinforcing layer, an adhesive layer, a barrier layer, a chemically resistant layer, any combination thereof, and the like, with the proviso that the article has an advantageous ultraviolet transmittance as described above. Any reasonable method of providing any additional layer is envisioned and is dependent upon the material chosen. Any thickness of the other layers may be envisioned. In an embodiment, the total thickness of the article may be at least 0.0005 inches to about 0.250 inches. It will be appreciated that the total thickness of the article can be within a range between any of the minimum and maximum values noted above.

In an embodiment, the article may be formed by any reasonable means and is dependent upon the material chosen and the final article desired. In an example, the layer of the fluoropolymer is provided by any reasonable means. In an embodiment, the fluoropolymer is formed by extrusion or injection molding. In an embodiment, the fluoropolymer is formed with an extrusion system. The extrusion system typically includes a pumping system and can include a number of devices that can be utilized to form the layer of the article. For example, the pumping system can include a pumping device such as a gear pump, a static mixer, an extruder, a die, such as a tube die, a cure device, a post-processing device, or any combination thereof. Typically, the fluoropolymer material is mixed and pumped, i.e. extruded, through the die of the extrusion system. Any reasonable mixing apparatus is envisioned. In an embodiment, heat may also be applied to the fluoropolymer material. For instance, any reasonable heating temperature for the components of the fluoropolymer material may be used to provide a material that can flow from the pumping system and extruded through the die without degradation of the material. For instance, the temperature may be about 250° C. to about 420° C. It will be appreciated that the heating temperature can be within a range between any of the minimum and maximum values noted above. In an exemplary embodiment, the die is configured to provide an extruded article with any dimension or shape envisioned. In a particular embodiment, the tube die is configured to provide an extruded tube with a circular shape; however, any dimension or shape is envisioned.

In an embodiment, the article is cooled after extrusion. Any method of cooling the article is envisioned. In an embodiment, the article is cooled at a temperature that is less than a melting temperature of the fluoropolymer. In a particular embodiment, the article is cooled at a temperature of about 1° C. to about 99° C., such as about 1° C. to about 70° C., or about 70° C. to 99° C. In a particular embodiment, the article is sprayed with aerosolized water. In a more particular embodiment, the aerosolized water is at a temperature of about 1° C. to about 99° C., such as about 1° C. to about 25° C. In an embodiment, the article is placed in a liquid having a temperature lower than room temperature, for instance, water at a temperature of less than 25° C. Any pressure of the aerosolized water is envisioned. In an embodiment, the pressure of the aerosolized water is at least about 0.1 barr, such as about 0.1 barr to about 10 barr. It will be appreciated that the water temperature and pressure can be within a range between any of the minimum and maximum values noted above.

Once the layer is formed, the article can undergo one or more post processing operations. Any reasonable post processing operations are envisioned. For instance, the article can be subjected to any radiation treatment, such as UV radiation, e-beam radiation, gamma radiation, and the like. Further, the article can be subjected to a post-processing thermal treatment. The post-processing thermal treatment typically occurs at a temperature of about 1° C. to about 250° C. Typically, the post thermal treatment occurs for a time period of about 5 minutes to about 10 hours, such as about 10 minutes to about 30 minutes, or alternatively about 1 hour to about 4 hours. It will be appreciated that the post thermal treatment temperature and time can be within a range between any of the minimum and maximum values noted above. In an alternative example, the article is not subjected to a post thermal treatment. In an example, the article is a flexible tube that can be cut into a number of flexible tubes having a specified length. In another embodiment, the post processing can include wrapping the flexible tube into a coil of tubing.

In an embodiment, the article is a flexible tube that includes an inner surface that defines a central lumen of the tube. For instance, the flexible tube may be provided that has any useful diameter size for the particular application chosen. In an embodiment, the tubing may have an outside diameter (OD) of up to about 5.0 inches, such as about 0.25 inch, 0.50 inch, and 1.0 inch. In an embodiment, the tubing may have an inside diameter (ID) of about 0.03 inches to about 4.00 inches, such as about 0.06 inches to about 1.00 inches. It is envisioned that the outside diameter and the inside diameter may be within the minimum and maximum values described.

In embodiment, the resulting article may have further desirable physical and mechanical properties. In an embodiment, the article has optical clarity. In an embodiment, the article appears transparent or at least translucent. For instance, the article may have a light transmission greater than about 50%, greater than about 75%, or greater than about 99% in the visible light wavelength range. In particular, the article has desirable flexibility and substantial clarity or translucency. In an embodiment, the article has a desirable crystallinity. Although not to be bound by theory, the crystallinity of the fluoropolymer provides optical clarity and advantageous ultraviolet transmittance. For instance, the fluoropolymer has a crystallinity of less about 50%, such as less than about 30%, less than about 20%, or less than about 10%. In an embodiment, the fluoropolymer has a crystallinity of about 1% to about 75%, such as about 1% to about 50%, such as about 1% to about 40%, such as about 1% to about 30%.

Although generally described as an article, such as a flexible tube, any reasonable polymeric article can be envisioned. The polymeric article may alternatively take the form of a film, a washer, a container, or a fluid conduit. For example, the polymeric article may take the form or a film, such as a laminate, or a planar article, such as a septa or a washer. In another example, the polymeric article may take the form of a fluid conduit, such as tubing, a pipe, a hose or more specifically flexible tubing, transfer tubing, pump tubing, chemical resistant tubing, high purity tubing, reinforced tubing, braided tubing, smooth bore tubing, fluoropolymer lined pipe, or rigid pipe, or any combination thereof. In a particular embodiment, a flexible tube is a water treatment tube, a peristaltic pump tube, such as for chemical or detergent dispensing, or a liquid transfer tube, such as a chemically resistant liquid transfer tube.

Applications for the article are numerous. In an exemplary embodiment, the article may be used in applications such as water treatment, industrial, wastewater or other applications where desirable UV transmittance, and/or chemical resistance, and/or low permeation to gases, and/or high purity are desired.

In an embodiment, the article is used with an apparatus for purifying water. For instance, the apparatus includes an ultraviolet source and the article, such as a flexible tube. Water flows through the inner conduit of the flexible tube by any reasonable means. In an embodiment, a pump is used with the apparatus to move the water from a proximal end of the flexible tube to a distal end of the flexible tube. Any length between the proximal end and the distal end is envisioned. Any flow rate is envisioned to provide water substantially free of a microorganism. In an embodiment, the flow rate is dependent upon several factors such as, for example, the diameter of the flexible tube, the thickness of the flexible tube, the ultraviolet source, the proximity of the ultraviolet source to the flexible tube, the type of microorganism being irradiated, and the like. "Microorganism" as used herein refers to bacteria, yeast, mold, algae, a virus, the like, or combination thereof.

As the water flows from the proximal end of the article to the distal end of the article, the water within the article is exposed to the ultraviolet source. Any ultraviolet source is envisioned along any length of the article. In an embodiment, the ultraviolet source is a "C" type providing radiation in a wavelength of about 200 nm to about 280 nm. Any time for exposure is envisioned. In an embodiment, the time for exposure is dependent upon flow rate of the water, amount of microorganism present before irradiation with the ultraviolet source, the proximity of the ultraviolet source to the article, the type of microorganism, the ultraviolet source, the thickness of the article, the diameter of the article when it is, for example, a flexible tube, the like, or combination thereof. Any reasonable time is envisioned such as 1 second to 10 minutes, such as 1 second to 5 minutes, such as 20 seconds to 2 minutes, or even 1 minute to 5 minutes. In an embodiment, the water is substantially free of a microorganism after exposure to the ultraviolet radiation. "Substantially free" as used herein refers to less than about 0.1%, or even less than 0.01% of a microorganism.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Embodiment 1. An article includes a layer including a melt processable fluoropolymer, wherein the fluoropolymer includes a copolymer of a tetrafluoroethylene and a perfluoroether, wherein the article has an ultraviolet transmittance of at least about 50% when measured at a thickness of about 0.040 inches to about 0.062 inches when exposed to ultraviolet radiation of about 200 nm to about 280 nm.

Embodiment 2. A method of making an article includes providing a layer including a melt processable fluoropolymer, wherein the fluoropolymer includes a copolymer of a tetrafluoroethylene and a perfluoroether, wherein the article has an ultraviolet transmittance of at least about 50% when measured at a thickness of about 0.040 inches to about 0.062 inches when exposed to ultraviolet radiation of about 200 nm to about 280 nm.

Embodiment 3. The article or the method of making the article of any of the preceding embodiments, wherein the copolymer of tetrafluoroethylene and the perfluoroether are present at a weight percent ratio of about 2% to about 12%, such as about 3% to about 10%, or about 4% to about 8%.

Embodiment 4. The article or the method of making the article of any of the preceding embodiments, wherein the melt processable fluoropolymer consists essentially of the copolymer of the tetrafluoroethylene and the perfluoroether.

Embodiment 5. The article or the method of making the article of any of the preceding embodiments, wherein the melt processable fluoropolymer consists of the copolymer of the tetrafluoroethylene and the perfluoroether.

Embodiment 6. The article or the method of making the article of any of the preceding embodiments, wherein the perfluoroether includes perfluoropropyl vinyl ether, perfluoromethyl vinyl ether, perfluoroethyl vinyl ether, or combination thereof.

Embodiment 7. The article or the method of making the article of any of the preceding embodiments, wherein the article has a shore D durometer of less than about 90, such as about 50 to about 60.

Embodiment 8. The article or the method of making the article of any of the preceding embodiments, wherein the article has a total thickness of about 0.0005 inches to about 0.250 inches.

Embodiment 9. The article or the method of making the article of any of the preceding embodiments, wherein the fluoropolymer has optical clarity.

Embodiment 10. The article or the method of making the article of any of the preceding embodiments, wherein the article has an ultraviolet transmittance of at least about 55%, at least about 60%, or at least about 65%.

Embodiment 11. The article or the method of making the article of any of the preceding embodiments, wherein the melt processable fluoropolymer has a crystallinity of at least about 1%, such as about 1% to about 75%, such as about 1% to about 50%, such as about 1% to about 40%, such as about 1% to about 30%.

Embodiment 12. The article or the method of making the article of any of the preceding embodiments, wherein the article has an inner surface providing a conduit for a fluid.

Embodiment 13. The article or the method of making the article of embodiment 12, wherein the fluid is water.

Embodiment 14. The article or the method of making the article of any of the preceding embodiments, wherein the article has a flexural modulus of at least about 400 MPa, such as about 500 MPa to about 650 MPa.

Embodiment 15. The article or the method of making the article of any of the preceding embodiments, wherein the melt processable fluoropolymer has a tensile yield of about 0.5% to about 15%, such as about 1% to about 15%, such as about 1% to about 10%.

Embodiment 16. The method of making the article of any of the preceding embodiments, wherein providing the layer includes extruding the melt processable fluoropolymer.

Embodiment 17. The method of making the article of embodiment 16, further including cooling the article at a temperature of about 1° C. to about 99° C.

Embodiment 18. An apparatus for purifying water includes a source of ultraviolet radiation; and a flexible tube, the flexible tube including a layer including a melt processable fluoropolymer, wherein the fluoropolymer includes a copolymer of a tetrafluoroethylene and a perfluoroether, wherein the flexible tube has an ultraviolet transmittance of at least about 50% when measured at a thickness of about 0.040 inches to about 0.062 inches when exposed to ultraviolet radiation of about 200 nm to about 280 nm.

Embodiment 19. The apparatus of embodiment 18, wherein the source of ultraviolet radiation is at a wavelength of about 200 nm to about 280 nm.

Embodiment 20. The apparatus of embodiments 18-19, wherein the copolymer of tetrafluoroethylene and the perfluoroether are present at a weight percent ratio of about 2% to about 12%, such as about 3% to about 10%, or about 4% to about 8%.

Embodiment 21. The apparatus of embodiments 18-20, wherein the melt processable fluoropolymer consists essentially of the copolymer of the tetrafluoroethylene and the perfluoroether.

Embodiment 22. The apparatus of embodiments 18-21, wherein the melt processable fluoropolymer consists of the copolymer of the tetrafluoroethylene and the perfluoroether.

Embodiment 23. The apparatus of embodiments 18-22, wherein the perfluoroether includes perfluoropropyl vinyl ether, perfluoromethyl vinyl ether, perfluoroethyl vinyl ether, or combination thereof.

Embodiment 24. The apparatus of embodiments 18-23, wherein the flexible tube has a shore D durometer of less than about 90, such as about 50 to about 60.

Embodiment 25. The apparatus of embodiments 18-24, wherein the tube has a total thickness of about 0.0005 inches to about 0.250 inches.

Embodiment 26. The apparatus of embodiments 18-25, wherein the fluoropolymer has optical clarity.

Embodiment 27. The apparatus of embodiment 18-26, wherein the flexible tube has an ultraviolet transmittance of at least about 55%, at least about 60%, at least about 65% or even greater.

Embodiment 28. The apparatus of embodiments 18-27, wherein the melt processable fluoropolymer has a crystallinity of at least about 1%, such as about 1% to about 75%, such as about 1% to about 50%, such as about 1% to about 40%, such as about 1% to about 30%.

Embodiment 29. The apparatus of embodiments 18-28, wherein the flexible tube has an inner surface providing a conduit for the water.

Embodiment 30. The apparatus of embodiment 29, wherein the water is substantially free of a microorganism.

The concepts described herein will be further described in the following examples, which do not limit the scope of the disclosure described in the claims. The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

Several tubes are formed using varying resins and two different processing conditions. The three different resin options 1, 2, and 3 are each a copolymer of a tetrafluoroethylene and a perfluoroalkyl vinyl ether. These tubes are compared to a baseline (Tube 5) of FEP (fluorinated ethylene propylene resin). The FEP is a copolymer of tetrafluoroethylene and hexafluoropropylene or a terpolymer of tetrafluoroethylene, hexafluoropropylene, and perfluoroalkyl vinyl ether.

Two different process conditions were used. The melt processable fluoropolymer is melted and then tubes are extruded and cooled either at a temperature above 70° F. (process A) or below 70° F. (process B).

The tubing had a wall thickness of 0.045 inches and UV transmission is measured at wavelengths from 200 nm to 295 nm. Results can be seen in Table 1:

TABLE 1

| Wavelength (nanometer) | Baseline Transmission (%) | TUBE 5 Baseline A | TUBE 6 Option 3B | TUBE 7 Option 3A | TUBE 8 Option 2B | TUBE 9 Option 2A | TUBE 11 Option 1B | TUBE 10 Option 1A |
|---|---|---|---|---|---|---|---|---|
| 200.00 | 101.43 | 21.45 | 56.89 | 51.08 | 56.44 | 51.87 | 46.66 | 47.72 |
| 205.00 | 102.50 | 20.28 | 53.78 | 48.29 | 53.36 | 49.03 | 44.11 | 45.11 |
| 210.00 | 101.50 | 21.11 | 58.84 | 53.12 | 58.29 | 51.04 | 45.92 | 46.96 |
| 215.00 | 101.14 | 25.88 | 62.99 | 57.22 | 61.27 | 54.75 | 50.52 | 51.98 |
| 220.00 | 100.57 | 30.30 | 65.32 | 59.67 | 64.44 | 57.92 | 54.64 | 56.04 |
| 225.00 | 99.55 | 34.96 | 67.33 | 62.08 | 66.50 | 60.34 | 58.34 | 59.29 |
| 230.00 | 99.56 | 39.51 | 69.35 | 64.25 | 68.15 | 62.44 | 61.31 | 61.89 |
| 235.00 | 99.23 | 43.70 | 70.41 | 65.33 | 69.04 | 63.91 | 63.24 | 64.03 |
| 240.00 | 99.76 | 47.80 | 71.31 | 66.41 | 69.89 | 65.17 | 65.06 | 65.75 |
| 245.00 | 99.71 | 51.16 | 71.84 | 67.12 | 70.32 | 65.71 | 66.09 | 66.93 |
| 250.00 | 99.79 | 53.55 | 71.58 | 67.00 | 70.00 | 65.80 | 66.54 | 67.10 |
| 255.00 | 100.02 | 55.49 | 71.31 | 67.09 | 70.04 | 65.62 | 66.97 | 67.46 |
| 260.00 | 100.01 | 57.34 | 71.55 | 67.40 | 70.37 | 65.85 | 67.72 | 68.22 |
| 265.00 | 99.75 | 59.23 | 72.27 | 68.08 | 70.92 | 66.60 | 68.70 | 69.09 |
| 270.00 | 99.85 | 60.89 | 72.89 | 68.81 | 71.64 | 67.26 | 69.82 | 70.23 |
| 275.00 | 99.78 | 62.28 | 73.56 | 69.75 | 72.39 | 68.00 | 70.72 | 71.26 |
| 280.00 | 99.79 | 63.73 | 74.37 | 70.43 | 73.30 | 68.86 | 71.71 | 72.29 |
| 285.00 | 99.86 | 64.84 | 74.85 | 71.17 | 73.87 | 69.45 | 72.55 | 72.96 |
| 290.00 | 99.78 | 65.65 | 75.27 | 71.81 | 74.36 | 69.95 | 73.16 | 73.67 |
| 295.00 | 99.77 | 66.41 | 75.76 | 72.15 | 74.84 | 70.41 | 73.87 | 74.10 |

Clearly, Options 1, 2, and 3 all have improved UV transmission across all wavelength values compared to the baseline tube (FEP). Further, the process using the lower cooling temperature shows an improvement in UV transmission for both Options 1 and 2.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of making an article comprises:
providing a single layer comprising a melt processable fluoropolymer, wherein the fluoropolymer comprises a copolymer of a tetrafluoroethylene and a perfluoroether heated to a temperature of 250° C. to 420° C. to extrude the fluoropolymer into a tube; and
cooling the tube at a temperature of less than 70° C. to provide the tube with optical clarity, an ultraviolet transmittance of at least about 50% when measured at a thickness of about inches to about 0.062 inches when exposed to ultraviolet radiation of about 200 nm to about 280 nm and a light transmission greater than 50% in the visible light wavelength range, wherein the article has a shore D durometer of less than about 90 at a temperature of about 23° C.+/−5° C.

2. The method of making the article of claim 1, further comprising cooling the article at a temperature less than a melting temperature of the fluoropolymer.

3. The method of making the article of claim 2, wherein cooling is at a temperature of about 1° C. to about 70° C.

4. The method of making the article of claim 3, wherein the temperature is about 1° C. to about 25° C.

5. The method of making the article of claim 2, wherein cooling is in water.

6. The method of making the article of claim 1, wherein the melt processable fluoropolymer consists essentially of the copolymer of the tetrafluoroethylene and the perfluoroether.

7. The method of making the article of claim 1, wherein the perfluoroether comprises perfluoropropyl vinyl ether, perfluoromethyl vinyl ether, perfluoroethyl vinyl ether, or combination thereof.

8. The method of making the article of claim 7, wherein the perfluoroether consists essentially of perfluoropropyl vinyl ether, perfluoromethyl vinyl ether, perfluoroethyl vinyl ether, or combination thereof.

9. The method of making the article of claim 1, wherein the copolymer of tetrafluoroethylene and the perfluoroether are present at a weight percent ratio of about 2 to about 12.

10. The method of making the article of claim 1, wherein the fluoropolymer with optical clarity is transparent.

11. The method of making the article of claim 1, wherein the article has an ultraviolet transmittance of at least about 60%.

12. The method of making the article of claim 1, wherein the melt processable fluoropolymer has a crystallinity of at least about 1%.

13. The method of making the article of claim 12, wherein the melt processable fluoropolymer has a crystallinity of about 1% to about 75%.

14. The method of making the article of claim 1, wherein the article has a total thickness of about 0.0005 inches to about 0.250 inches.

15. The method of making the article of claim 1, wherein the article has an inner surface providing a conduit for a fluid.

16. The method of making the article of claim 15, wherein the fluid is water.

17. The method of making the article of claim 1, wherein the layer is substantially free of a co-agent, an antioxidant, a filler, an ultraviolet agent, a dye, a pigment, an anti-agent agent, a plasticizer, or a combination thereof.

18. The method of making the article of claim 1, wherein the layer comprises at least 95% by weight of the fluoropolymer.

* * * * *